March 24, 1931.  G. P. BERRY  1,797,751
SHOCK ABSORBER
Filed Nov. 20, 1928
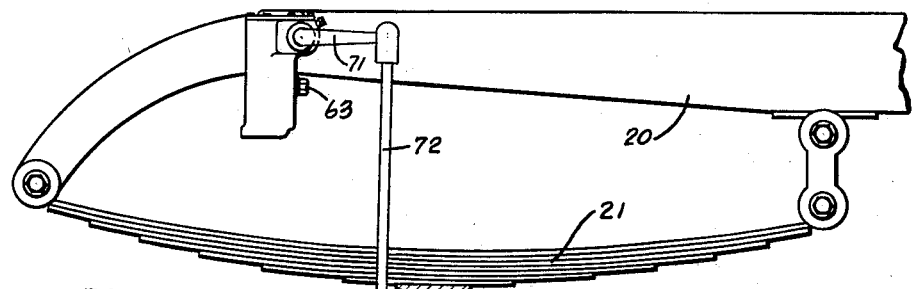
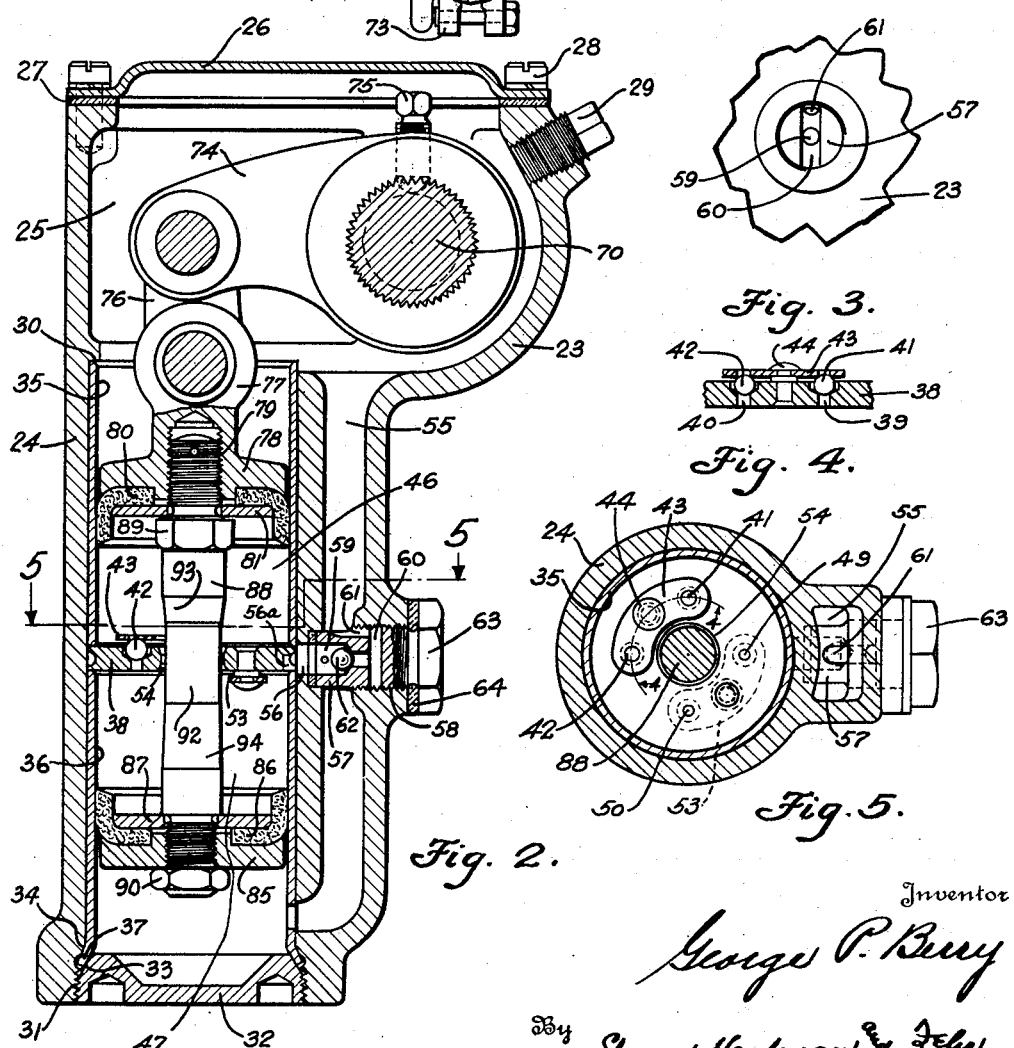
Inventor
George P. Berry
By Spencer, Hardman & Felw
Attorney Patented Mar. 24, 1931

1,797,751

UNITED STATES PATENT OFFICE

GEORGE P. BERRY, OF DETROIT, MICHIGAN, ASSIGNOR TO GENERAL MOTORS RESEARCH CORPORATION, OF DETROIT, MICHIGAN, A CORPORATION OF DELAWARE

SHOCK ABSORBER

Application filed November 20, 1928. Serial No. 320,691.

This invention relates to improvements in shock absorbers adapted to cushion the movement of two relatively movable members, for example the frame and axle of a vehicle.

It is among the objects of the present invention to provide a shock absorber of simple and compact construction capable of resisting both the approaching and separating movements of the frame and axle of a vehicle and by such resistance dissipate road shocks and prevent their transmission to the vehicle frame.

Further objects and advantages of the present invention will be apparent from the following description, reference being had to the accompanying drawings, wherein a preferred embodiment of one form of the present invention is clearly shown.

In the drawings:

Fig. 1 illustrates a front portion of the frame of an automotive vehicle supported by a spring upon the usual axle, a shock absorber embodying the present invention being shown applied thereto.

Fig. 2 is a cross sectional view taken longitudinally through the shock absorber, certain portions of the structure being shown in elevation for the sake of clearness.

Fig. 3 is a fragmentary view taken along the edge of the shock absorber, a certain member of the shock absorber being removed, more clearly to illustrate the interior structure.

Fig. 4 is a fragmentary detail sectional view of one of the high pressure relieving valve mechanisms.

Fig. 5 is a fragmentary sectional view taken along the line 5—5 of Fig. 2.

Referring to the drawings, the numeral 20 designates the frame of the vehicle which is supported upon the axle 22 by springs 21, only one of which is shown.

The shock absorber comprises a casing 23 presenting a cylindrical portion 24 and a fluid chamber 25. The fluid chamber is sealed against fluid leaks by a cover 26 provided with a gasket 27 and held upon the casing by screws 28. Casing 23 has a screw-threaded aperture provided with a plug 29, removal of which permits fluid to be added to the fluid chamber without removal of the cover 26. The cylindrical portion 24 of the casing has its one open end communicating with the fluid chamber 25. An annular flange 30 is provided in the cylindrical portion adjacent its point of communication with the fluid chamber. The other end of the cylindrical portion is interiorly screw-threaded as at 31, said end receiving a plug 32, the inner end of which is tapered inwardly as at 33. The inner wall of the cylindrical portion has a tapered portion 34 adjacent to and coincidental with the tapered portion 33 of the plug. Within the cylindrical portion 24, and, in the upper end thereof, there is provided a cylindrical lining member 35, the one end of which abuts against the annular flange 30 as shown in the Fig. 2. The lower end of the cylindrical portion 24 has a cylindrical lining member 36, the lower end of which is flared as at 37, said flared end being clamped between the tapered walls 33 and 34 of the plug 32 and cylindrical portion 24 respectively. The tapered portion 33 of the plug 32 thus forces the flared end 37 against the tapered wall 34 of the cylinder, and thereby provides a substantially fluid-tight seal at this end of the cylinder. Interposed between the inner ends of the cylindrical members 35 and 36 is a partition 38, said partition being clamped immovably between said cylindrical members 35 and 36 due to the force exerted upon the cylindrical member 36 by the plug 32 in a direction toward the upper end of the cylinder.

The partition 38 carries sets of oppositely acting valves, one set of which permits fluid to flow through the partition in one direction under certain conditions, the other set permitting fluid to flow through the partition in an opposite direction under other conditions.

In referring to the Fig. 5, the one set of valves is shown in full lines, the other set in dotted lines. Fig. 4 is a detailed sectional view taken on the line 4—4 of Fig. 5, and shows one set of these valves. In this figure the partition 38 is shown having two passages 39 and 40, provided with a valve seat portion upon which valves 41 and 42 are yieldably maintained by a blade spring 43. This blade spring is supported by a stud 44 carried by the partition 38. The partition 38 divides the cylindrical portion 24 into two compartments, the one designated by the numeral 46 being termed the "bumper" chamber, 47 the "snubber" chamber. The valves 41 and 42 supported by the partition 38 permit fluid to flow through passages 39 and 40 only in one direction, that is, from the compartment 47 into the compartment 46. The other set of valves, supported on the partition 38 and shown in dotted lines in Fig. 5, include valves similar to 41 and 42, which are seated in passages 49 and 50. Maintained on the seats of said passages by the spring 53, these valves permit fluid to flow only from the compartment 46 through the passages 49 and 50 into the compartment 47. Partition 38 has a central orifice 54 whose function will be described hereinafter.

Casing 23 has a by-pass 55 forming communication between the fluid chamber 24 and the cylinder compartment 47, adjacent the plug 32. A passage 56 extends through the inner wall of the casing, connects with an aperture 56a in the partition and thereby provides communication between the compartment 47 of the cylinder and the by-pass 55. A one-way valve controls the fluid flow through passage 56 so that under certain conditions fluid may flow from the by-pass 55 through passages 56 into the compartment 47, but not in a reverse direction, that is from the compartment 47 into the by-pass 55. This valve comprises a plug member 57 screw threaded into an opening 58 provided in the outer wall of the casing 23, the inner end of said plug extending into a counter bored enlargement provided in passage 56. Plug 57 has a central passage 59 communicating with the passage 56, an end passage 60 communicating with the passage 59, and a passage 61 on the outer edge providing communication between the end passage 60 and the by-pass 55. A ball check valve 62 normally rests upon a valve seat provided in the passage 59 to close said passage when there is a tendency of the fluid to flow from compartment 47 through passages 56 and 59 into passage 60. However, said valve 62 will be moved to open passage 59 when the condition of the shock absorber necessitates the introduction of additional fluid into the compartment 47. A cap screw 63, provided with a gasket 64, maintains the valve plug 57 in proper position and at the same time seals the screw-threaded aperture 58 against fluid leaks at this point.

The shock absorber casing presents bearing portions, not detailedly shown, which rotatably support the rocker shaft 70, one end of which extends outside the casing and is provided with an operating arm 71, the free end of which is swivelly attached to one end of the connecting rod 72, the other end of said connecting rod being swivelly secured to a bracket 73 anchored to the axle 22. Within the fluid chamber 25 a rocker arm 74 is attached to the rocker shaft 70 so that no rotating movement between the shaft and rocker arm obtains. A set screw 75 on the rocker arm extends into an annular groove formed in the shaft 70, preventing relative endwise movement between the shaft and the rocker arm. The free end of the rocker arm has a link 76 attached thereto, said link being attached also to an extension of the piston 77, said piston being reciprocatively supported within the cylindrical lining member 35. This piston comprises a main body portion 78 having a central, screw threaded recess 79. A packing element 80 is provided on the body portion 78 of the piston, said packing having a recessed washer 81 adapted to hold it in proper position upon the piston. Within the cylindrical lining member 36 there is provided a piston 85, the main body portion of which having a central screw-threaded aperture substantially coaxial of aperture 79 of piston 77, said piston 85 having also a packing element 86 provided with a washer 87 similar to the washer 81 of piston 77. Both pistons 77 and 85 are tied together by a piston pin 88, the end of the pin secured to the piston 77 being screw threaded and received by the screw threaded aperture 79 of said piston. This end of the pin is also provided with a flat-sided portion 89 furnishing means by which the pin may be gripped by any suitable tool and also provides means whereby a shoulder is formed which engages with the washer 81 to force it toward the body portion for clamping the packing member 80 securely to said piston. The other end of the piston rod 88 has a screw-threaded portion entering the screw threaded aperture of the piston 85, a shoulder also being provided at this end of the pin for engaging washer 87 to exert pressure thereon tightly to clamp the packing 86 upon the piston 85. A locknut 90 is screw threaded upon the end of the piston rod to prevent accidental turning of the rod relative to the piston 85. The piston rod 88 extends through the central orifice 54 of the partition 38. The portion of the piston rod extending through said orifice 54 is of slightly less diameter than said orifice and comparatively less in transverse dimension than the main body of the piston rod 88. This reduced portion of the piston rod is designated by the numeral 92. On the one side of the partition 38, or more specifically within the compartment 46 as designated in Fig. 2, the reduced diameter portion 92 of the pin 88 tapers outwardly as at 93 to meet the main body portion of the piston pin. The other end of the reduced portion 92 tapers outwardly as at 94. Tapered portion 93 is more abrupt than the tapered portion 94, and therefore the orifice 54 is reduced more quickly when the piston 77 approaches the partition 38 than when piston 85 moves toward said partition.

Normally the various elements of the device are in positions as illustrated in the Fig. 2. When the wheels of the vehicle strike an obstruction in the roadway, spring 21 will be flexed upwardly toward the frame 20, causing a consequent movement of rod 72 and arm 71 to rotate shaft 70 in a counter-clockwise direction. This will cause the rocker arm 74 to move the piston downwardly in the cylindrical portion 24. The piston will now exert pressure upon fluid contained within the compartment between partition 38 and piston 78. Normally the only exit for this fluid is through the space provided between the wall of the orifice 54 and the piston pin 88. Initially this space is of a predetermined size, but due to the flared portion 93 of the piston pin, said space will eventually be reduced as the piston 78 approaches the partition 38. Reduction of the orifice restricts the fluid increasingly and thus the movement of the piston toward the partition 38 will be resisted increasingly and consequently the flexing of the spring 21 toward the frame 22 will likewise be resisted increasingly. Fluid flowing from beneath piston 78 and through orifice 54 will enter the space between the piston 85 and the partition 38. If for any reason fluid leaks past the piston 85, an insufficient fluid supply between the said piston and the partition will obtain. To compensate for any such loss, there is provided a loading valve 62 which, as the piston 85 moves downwardly, opens to establish a fluid flow from the by-pass 55 through passages 61 and 60 past the valve 62, through passages 59, 56 and 56a into the space between partition 38 and piston 85, thus replenishing the supply of fluid.

As soon as the spring 21 has reached the limit of its flexure, caused by striking a certain obstruction, its tendency is to return to the normal, unflexed position with a sudden, rebounding movement which results in jolts and shocks being transmitted to the frame of the vehicle. The device of the present invention provides for immediate gripping of the spring at its flexed position and a gradual release to permit gradual return toward the unflexed position. The pistons having been moved toward the bottom of their respective compartments by the movement of the spring toward its flexed position will, upon return movement, move upwardly in their respective cylinder compartments. In the lower position the tapered portion 93 of pin 88 will be substantially within the orifice 54 of partition 38, thus reducing the fluid flow capacity of said orifice. Upon the return movement of the piston 85 toward the partition 38 the fluid therebetween will be compressed and forced through the orifice 54, which, being restricted by the tapered portion 93, will substantially restrict the fluid flow therethrough until such a time when the piston rod 88 has moved to bring its smaller diameter portion 92 within the field of orifice 54, at which time said orifice will have been enlarged to increase its fluid flow capacity and consequently the restriction to the flow of fluid will have been reduced. Continued movement of the piston 85 will cause the tapered portion 94 to enter the orifice and restrict it increasingly to reduce the fluid flow capacity of this orifice, and thus the fluid flow from the chamber above piston 85 through said orifice will increasingly be restricted during the final, upward movement of the piston.

From the aforegoing it may be seen that as the spring 21 returns toward its normal position, it will, through the initial portion of its range of movement, be decreasingly resisted, and through the intermediate portion be resisted slightly, and through the final portion of said travel be resisted increasingly.

Any undue pressures, that is, pressures exceeding a predetermined degree within the chambers between either of the pistons 77 and 85 and the partition 38 will be relieved by the valves supported by said partition. If the fluid pressure within the bumper compartment exceeds a proper degree, the valves, included in passages 49 and 50 of the partition, and yieldably urged by the spring 53, will be opened to establish an additional flow of fluid from the bumper compartment into the snubber compartment. If piston 85 creates an undue pressure within the bumper compartment, valves 41 and 42 will be unseated against the effect of spring 43 to establish a flow of fluid through passages 39 and 40 in addition to the flow of fluid through the orifice 54.

From the aforegoing it may be seen that applicant has provided a device of simple structure and design adapted to control the approaching and separating movements of the axle and frame of a vehicle to overcome jars and jolts. He has provided a device in which a single element, that is, the piston pin 88, provides a connection between two pistons to be reciprocated simultaneously, said pin providing means for clamping the packing elements upon their respective pistons and also providing a metering pin for controlling the transfer of fluid from one compartment to the other at a proper rate. The device is so designed that it may be built and assembled at a minimum expense of time and material.

While the form of embodiment of the present invention, as herein disclosed, constitutes a preferred form, it is to be understood that other forms might be adopted, all coming within the scope of the claims which follow.

What is claimed is as follows:

1. A shock absorber, comprising in combination, a casing presenting a cylinder and a fluid chamber in communication therewith; a piston in said cylinder; means for reciprocating said piston; a transverse partition within said cylinder, having a plurality of orifices; a metering pin carried by the piston and extending through one of said orifices, and cooperating therewith to control the discharge of fluid through the partition in response to the movement of the piston in one direction; and a spring loaded valve in the other orifice of the partition for establishing a flow of fluid through said orifice in response to pressure caused by the movement of the piston in the other direction.

2. A shock absorber, comprising in combination, a casing presenting a cylinder and a fluid chamber; a partition between said cylinder dividing it into two compartments; a port in said partition; a piston within each cylinder compartment; a metering pin extending through the port in the partition and providing a rigid connection between the pistons, said pin controlling the flow of fluid through the port in accordance with the movement of either piston toward the partition; valved passages in said partition, adapted to establish an additional flow of fluid through the partition in response to excessive pressure caused by the movement of a respective piston toward the partition; and piston operating means connected to one of said pistons.

3. A shock absorber, comprising in combination, a casing presenting a cylinder and a fluid chamber; a partition within said cylinder dividing it into two compartments; a port in said partition; a piston within each cylinder compartment; a metering pin extending through the port in the partition and providing a rigid connection between the pistons; said pin controlling the flow of fluid through the port in accordance with the movement of either piston toward the partition; a plurality of orifices in said partition; spring-loaded check valves yieldably closing certain of said orifices from one side of the partition and other of said orifices from the opposite side of the partition, the valves on one side being adapted to establish a flow of fluid through the partition in response to excessive pressure within the cylinder compartment on the opposite side of the partition; and piston operating means connected to one of said pistons.

4. A shock absorber, comprising in combination, a casing presenting a cylinder closed at one end, the other end opening into a fluid chamber; a by-pass connecting the fluid chamber with the cylinder adjacent its closed end; a partition within the cylinder, dividing it into two compartments, said partition having a plurality of passages therethrough providing for the transfer of fluid from one compartment into the other; a piston in each compartment of the cylinder; an oscillatable lever connected with one of said pistons; a piston rod extending through one of the passages in the partition and connecting one piston to the other, said piston rod having provisions for controlling the rate of fluid flow through said passage in accordance with the movement of said pistons; oppositely acting one-way valves in the other passages of the partition, each acting to establish a flow of fluid from one compartment to the other in response to excessive fluid pressure caused by the approaching movement of a respective piston; and a check valve between the by-pass and one of the cylinder compartments, adapted to maintain a proper fluid supply within said compartment.

5. A shock absorber, comprising in combination, a casing presenting a cylinder opening into a fluid chamber and an annular flange provided between the cylinder and fluid chamber; a cylindrical lining member for one portion of the cylinder, one end of said lining engaging the annular flange; another cylindrical lining member for the other portion of the cylinder, one end of said other lining member being flared outwardly; an apertured partition within said cylinder and interposed between adjacent ends of the lining members; and a tapered plug, screw-threaded into the end of the cylinder, said plug exerting radial pressure upon the flared end of the one lining member tightly to press it against the casing, providing a substantially fluid-tight seal and urging said other lining member toward the partition to hold said partition substantially immovable and to maintain the first mentioned lining member against the annular flange.

In testimony whereof I hereunto affix my signature.

GEORGE P. BERRY.